United States Patent [19]

Leonard et al.

[11] Patent Number: 4,863,600
[45] Date of Patent: Sep. 5, 1989

[54] HOLLOW FIBER BUNDLE HAVING TRANSVERSE BINDING MEANS AND METHOD OF MAKING SAME

[75] Inventors: Ronald J. Leonard, Harvard; Kenneth M. Johnson, Lindenhurst, both of Ill.

[73] Assignee: Baxter International Inc., Deerfield, Ill.

[21] Appl. No.: 945,141

[22] Filed: Dec. 22, 1986

Related U.S. Application Data

[62] Division of Ser. No. 668,629, Nov. 5, 1984, Pat. No. 4,547,289.

[51] Int. Cl.⁴ .............................................. B01D 13/00
[52] U.S. Cl. ........................... 210/321.74; 210/321.79; 210/321.89; 264/103
[58] Field of Search .................. 210/321.3, 321.1, 450, 210/433.2, 500.23, 321.74, 321.79, 321.89, 326.61; 55/16, 158; 242/7.02, 7.14, 7.21; 264/103; 156/172, 173

[56] References Cited

U.S. PATENT DOCUMENTS

| | | | |
|---|---|---|---|
| 3,536,611 | 10/1970 | Defilippi et al. | 210/321.1 X |
| 4,172,794 | 10/1979 | Sigdell | 210/232 |
| 4,368,124 | 1/1983 | Brumfield | 210/321.3 |
| 4,425,234 | 1/1984 | Reitz | 210/500.23 X |
| 4,430,219 | 2/1984 | Kuzumoto et al. | 210/500.23 X |

Primary Examiner—Frank Spear
Attorney, Agent, or Firm—Paul C. Flattery; Gary W. McFarron

[57] ABSTRACT

A mass transfer device (60) includes a hollow fiber bundle (10) comprising a generally cylindrical core (14) having opposed ends, a plurality of layers of hollow fiber (12) that have been wound around the core, and binding means (48a, 48b, 48c), such as double-sided pressure-sensitive tape that have been wound around the layers of hollow fiber in a plurality of longitudinally spaced locations along the core and intermediate the opposite ends of the core for providing longitudinally spaced support means for the hollow fiber bundle. The hollow fiber bundle is enclosed in a housing (62) having an inner wall (80) which defines a generally circular opening for receiving the hollow fiber bundle except that the inner wall adjust a fluid outlet manifold (74) includes an expansion volume (82) for the hollow fibers that are adjacent that fluid outlet manifold. A screen (88) is provided adjacent the fluid outlet manifold to prevent the fibers from migrating too far into the outlet and to provide a controlled expansion.

12 Claims, 3 Drawing Sheets

HOLLOW FIBER BUNDLE HAVING TRANSVERSE BINDING MEANS AND METHOD OF MAKING SAME

This is a division of application Ser. No. 668,629, filed on 11/5/84, now U.S. Pat. No. 4,690,758.

TECHNICAL FIELD

The present invention concerns a novel process for making a stabilized hollow fiber bundle. The illustrative embodiment concerns a novel process for making a stabilized hollow fiber bundle for a mass transfer device and also concerns a novel mass transfer device having void volume control.

BACKGROUND ART

In U.S. Pat. No. 3,794,468, issued Feb. 26, 1974, in the name of Ronald J. Leonard for "Mass Transfer Device Having a Wound Tubular Diffusion Membrane" and assigned to the assignee of the present invention, a mass transfer device is disclosed. The mass transfer device disclosed in that patent is made by winding a length of hollow tubular conduit of semipermeable membrane about a core to form a wound bundle similar to packages of kite string, in which individual adjacent windings in the same layer are generally parallel to each other, but individual adjacent windings of the conduit in adjacent layers define an angle to each other. The device of that patent is assembled by winding a length of the hollow tubular conduit of semipermeable membrane about a core in a plane which defines an acute angle to the longitudinal axis and intersects both ends of the core. Simultaneously, the core is rotated about its longitudinal axis, or the plane of winding is correspondingly rotated to the same effect, to laterally displace on the core each winding of conduit from its immediately preceding winding. The resulting wound structure allows a low cost construction of a high performance mass transfer device. The flow pattern is around the circumference of the cylindrical element formed by the winding process. However, as the flow goes around the circumference, it will encounter flow paths of different length. Additionally, since the core is rotated at a constant rotational velocity and the angular velocity of the wind is constant, the void fraction of the resulting structure increases radially outwardly of the bundle. In other words, the void fraction near the outside of the bundle will be greater than the void fraction on the inside of the bundle. As used herein, the term "void fraction" connotes the ratio of space to space and fiber, whereby a greater void fraction means more space.

In U.S. application Ser. No. 592,835, filed Mar. 23, 1984, now U.S. Pat. No. 4,576,446, in the names of Ronald J. Leonard and Kenneth M. Johnson for "Bundle Wind System" and assigned to the assignee of the present invention, we pointed out our discovery that performance of the mass transfer device is decreased if the void fraction near the outside of the bundle is substantially greater than the void fraction near the inside of the bundle. We found that an optimum hollow fiber mass transfer device, such as an oxygenator, comprises a bundle in which the flow rate is substantially constant throughout the bundle, the blood outlet saturation is substantially constant throughout the bundle, and the void fraction increases slightly in the radial outward direction of the bundle. In U.S. application Ser. No. 592,835, we disclosed a process for obtaining this optimum device and also disclosed a device having these optimum properties.

The hollow fiber arrangement according to U.S. Pat. No. 3,794,468 and U.S. patent application Ser. No. 592,835 are wound at high length to diameter ratios to limit the fiber loss resulting from crossing over the ends of the bundle. The fiber is cut off to expose the ends of the fiber for gas flow. Length to diameter ratios of approximately four have been found to be practical. However, as the unsupported fiber length increases, it is subject to greater forces due to the blood flow over the fiber. These forces result in a stretching of the fiber due to the elasticity of the fiber, causing the fiber to move out of position in the bundle in the direction of blood flow. Such movement of the fiber is a function of the flow velocity, fluid density, fiber length change per unit length per unit of force per unit of area, fiber inner and outer diameter, and fiber length. The movement of the fiber destroys the precision wind with its controlled variable void volume and causes a migration of fiber toward the outlet of the fiber container device which lowers the void fraction locally in the outlet area. This reduction in void fraction results in a high increase in pressure drop due to the strong dependence of pressure drop on the void fraction. We have discovered a novel process for making a hollow fiber bundle in which this undesirable fiber deflection is reduced.

We have also dicovered that as the fibers move into a fixed volume outlet area, the void fraction decreases. We have discovered a novel mass transfer device which alleviates the outlet void fraction decrease problem.

DISCLOSURE OF THE INVENTION

In accordance with the present invention, a process is provided for making a hollow fiber bundle, comprising the steps of providing a core having a longitudinal axis and opposite ends, winding a length of the hollow fiber around the core from an arm in a plane that is at an acute angle with respect to the longitudinal axis of the core and is between the opposite ends of the core, providing relative rotation between the longitudinal axis and the position of the winding arm, and during winding of the hollow fiber around the core, applying binding means over layers of hollow fiber in a plurality of longitudinally spaced locations along the core and intermediate the opposite ends to provide longitudinally spaced support means for the hollow fiber bundle.

The longitudinally spaced support means stabilize the bundle by reducing the unsupported lengths of fiber. In the illustrative embodiment, the binding means are applied in a plurality of equally spaced locations along the core and preferably comprise double-sided pressure-sensitive tape which is applied from a fixed location to the core which is rotating around its longitudinal axis.

In accordance with the present invention, a hollow fiber bundle is provided which comprises a generally cylindrical core having opposite ends, a plurality of layers of hollow fiber that have been wound around the core, and binding means in a plurality of longitudinally spaced locations along the core and intermediate the opposite ends for providing longitudinally spaced support means for the hollow fiber bundle. The mass transfer device of the present invention includes a housing for enclosing the hollow fiber bundle. The housing comprises a first fluid inlet manifold on one side thereof, a first fluid inlet port communicating with the first fluid inlet manifold, a first fluid outlet manifold on another side thereof, a first fluid outlet port communicating with the first fluid outlet manifold, and a second fluid inlet port at one end of the housing. An inner wall defines a generally circular opening for receiving the hollow fiber bundle except that the inner wall adjacent the first fluid outlet manifold includes an expansion volume for the hollow fibers that are adjacent the first fluid outlet manifold.

In the illustrative embodiment, a screen is positioned adjacent the first fluid outlet manifold to prevent the fibers from migrating too far into the outlet. Thus a controlled expansion is provided. During operation of the mass transfer device, as fibers move into the expansion volume, they move into an area of increased volume and a void fraction decrease is alleviated.

A more detailed explanation of the invention is provided in the following description and claims, and is illustrated in the accompanying drawings.

DETAILED DESCRIPTION OF THE ILLUSTRATIVE EMBODIMENT

Figure 1:
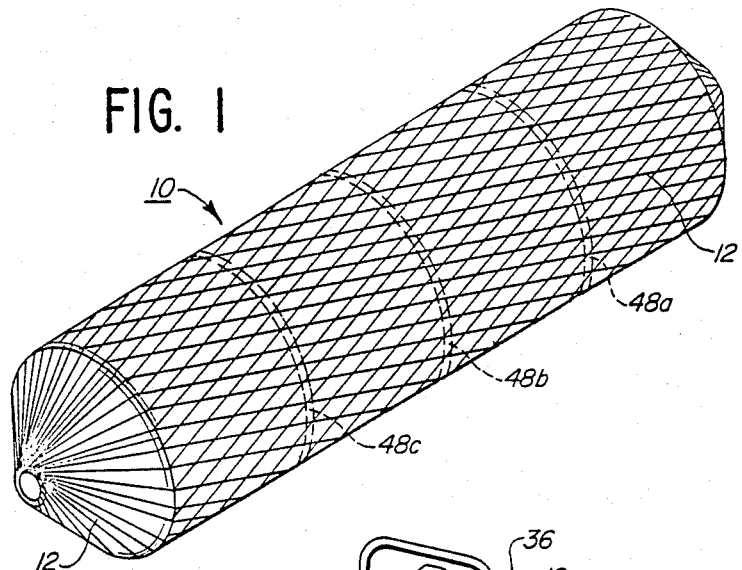
FIG. 1 is a perspective view of a mass transfer device bundle, prior to its being enclosed within a housing, constructed in accordance with the principles of the present invention.
Figure 2:
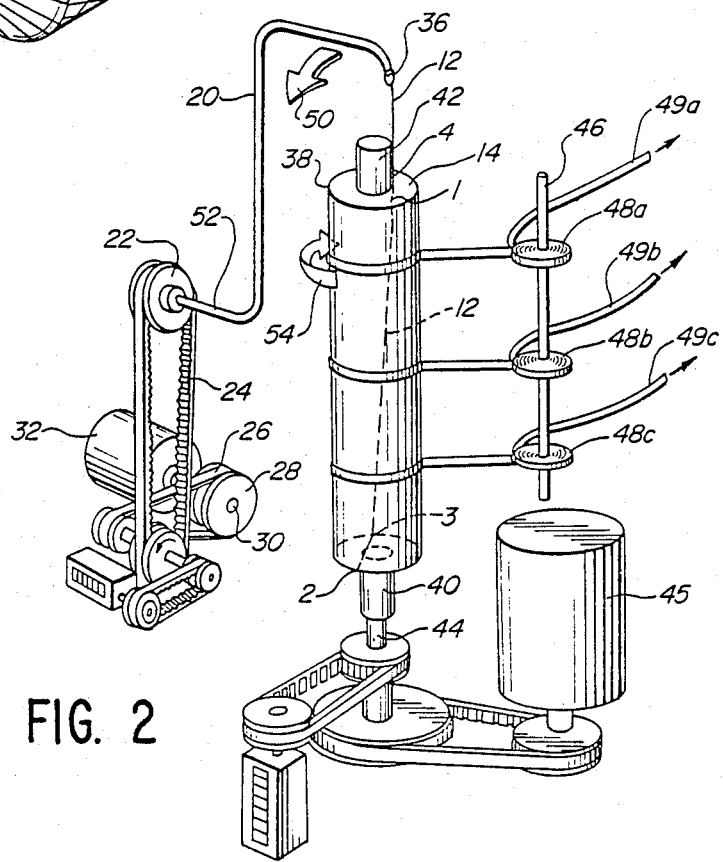
FIG. 2 is a perspective view of a core and winding mechanism.

Referring to FIGS. 1 and 2, a hollow fiber bundle 10 is formed by winding a hollow fiber 12 around core 14. FIG. 1 shows bundle 10 in a condition after the hollow fiber 12 has been wound around the core 14 and before the bundle ends have been cut transversely as is disclosed in U.S. Pat. No. 3,794,468. In FIG. 1, bundle 10 is formed of a hollow fiber 12 of semipermeable membrane that is wound about a core 14 to form a multilayer winding of the fiber in which individual adjacent windings in the same layer are generally parallel to each other, but individual adjacent windings of the fiber in adjacent layers define an angle to each other. The ends of the core transverse to the fiber windings are then potted with a curable sealant. After cure of the sealant, the ends of the wound core are cut transversely through medial portions of the cured sealant to sever the fiber into a plurality of individual fibers, the resulting sections being secured together at their ends by portions of the cured sealant, and having their hollow bores open to the exterior. Thereafter, manifolds are applied to provide an oxygen flow path through the hollow bores of the fiber portions and a blood flow path between the exteriors of the fiber portions.

Although the illustrative embodiment concerns an oxygenator, it is to be understood that the present invention is applicable to other types of mass transfer devices. Additionally, reference to various information concerning this subject matter is made to copending U.S. patent application Ser. No. 592,835, filed Mar. 23, 1984, the disclosure of which is incorporated herein.

Referring to FIG. 2, an apparatus is illustrated therein for winding the bundle in accordance with the principles of the present invention. The apparatus comprises a winding arm 20 that is driven by pulley 22 coupled through belt drives 24 and 26 which are connected to pulley 28 that is keyed to the shaft 30 of motor 32. Arm 20 is hollow and a hollow fiber 12 from a suitable source (not shown) extends through arm 20 and out its distal end 36.

Core 14 having hollow end extensions 40, 42 is positioned on a spindle 44 with the end extensions 40, 42 being coaxial with the spindle 44 and the axis of the cylindrical core 38. Spindle 44 is driven by a suitable driving means, including a variable speed motor 45. The spindle and hence the core axis are at an acute angle with respect to the plane of the wind of winding arm 20, preferably 3.8°. In this manner, with reference to FIG. 2, when arm 20 is rotated, the wind will travel from point 1 which is in a plane on one side of extension 42 to point 2 which is in a plane on the opposite side of extension 42, to point 3 which is in a plane on the same side of extension 42 as point 2, and to point 4 which is in a plane on the same side of extension 42 as point 1.

A shaft 46 having three rolls of double-sided pressure-sensitive tape 48a, 48b and 48c is located a fixed distance from spindle 44. Tape rolls 48a, 48b and 48c are equally spaced from each other and the tape is applied over the core 14 as illustrated in FIG. 2. The spacings of rolls 48a, 48b and 48c from each other are such that core 14 is divided into four equal portions. It is to be understood that no limitation is intended with respect to the number of tape rolls or the divisions of the core that are provided by applying the tape.

The double-sided pressure-sensitive tape acts as a binding means to provide three longitudinally spaced support means for the hollow fiber bundle. In this manner, the bundle is stabilized because there is less deflection of the hollow fiber length during operation.

Tape rolls 48a, 48b and 48c are driven by the rotation of core 14 so that the tape encircles the core with each rotation of the core. In this manner, each other layer of fiber on the core is encircled by the double-sided pressure-sensitive tapes which are continuously applied around the fiber to separate the fiber into four portions. The longitudinal support that is provided by the binding means alleviates the problem with the fibers being forced toward the outlet and the pressure drop problem is alleviated.

The double-sided pressure-sensitive tape that is used in the illustrative embodiment is one-eighth inch wide and has an overall thickness of 0.001 inch. As the tape is being applied to the bundle, separation paper 49a, 49b and 49c which is conventionally interposed between the tape layers is moved to the opposite direction as illustrated. The tape which is being applied to the bundle is cut before the last layer of fiber is wound so that the top layer of fiber will not have tape over it. This provides a more attractive appearance and also enables the bundle to be easier to handle because it is not sticky and it is thus easier to place into the oxygenator housing.

While the illustrative embodiment uses double-sided pressure-sensitive tape as the binding means, other binding means such as pressure-sensitive string or liquid adhesive may be used.

The hollow fiber 12 is wound about core 14 until an appropriately thick bundle is formed. Winding arm 20 moves in the direction of the arrow 50 about the axis of portion 52 of winding arm 20. The core rotates in the direction of arrow 54 about the spindle of axis 44 which, as stated above, is at an acute angle with respect to the direction of the wind and thus is not perpendicular to the axis of portion 52.

For simplicity, in FIG. 2 only one fiber 12 is described. However, in accordance with the invention, more than one fiber may be wound at a time, providing that the additional fibers are accounted for in the ratio between the rotation of the winding arm and the rotation of the core so that the correct void fraction is maintained. To this end, fiber 12 may comprise four adjacent hollow fibers which extend through winding arm 20. In order to provide the correct void fraction, it is desirable that core 14 rotate in the direction of arrow 54 faster, for example four times faster, than the rotation of the core if only a single hollow fiber were being wound about the core.

Figure 3:
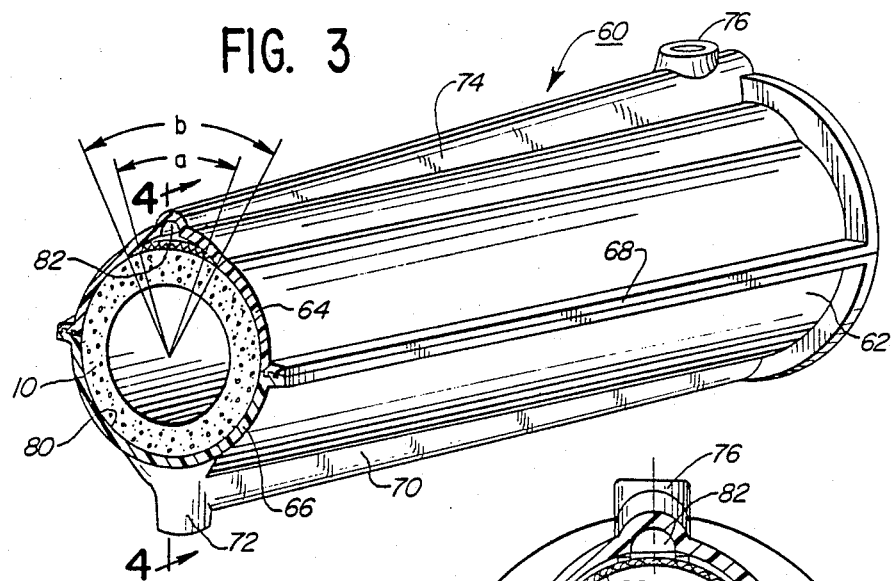
FIG. 3 is a perspective view of a mass transfer device with a cross-section taken at one end for clarity.

An oxygenator utilizing the hollow fiber bundle 10 of FIG. 1 is illustrated in FIGS. 3-7. Referring to FIG. 3, the oxygenator 60 comprises an outer housing 62 formed of an upper section 64 and a lower section 66 which mate at joint 68. The housing defines a blood inlet manifold 70 having a blood inlet port 72 communicating therewith, a blood outlet manifold 74 having a blood outlet port 76 communicating therewith, and an oxygen inlet (not shown) at one end of the housing in the conventional manner.

Figure 4:
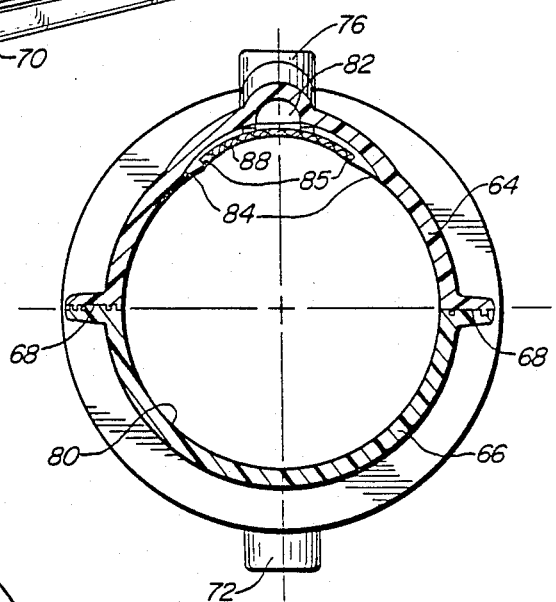
FIG. 4 is a cross-sectional view of the housing without the bundle, taken along the plane of the line 4—4 of FIG. 3.
Figure 6:
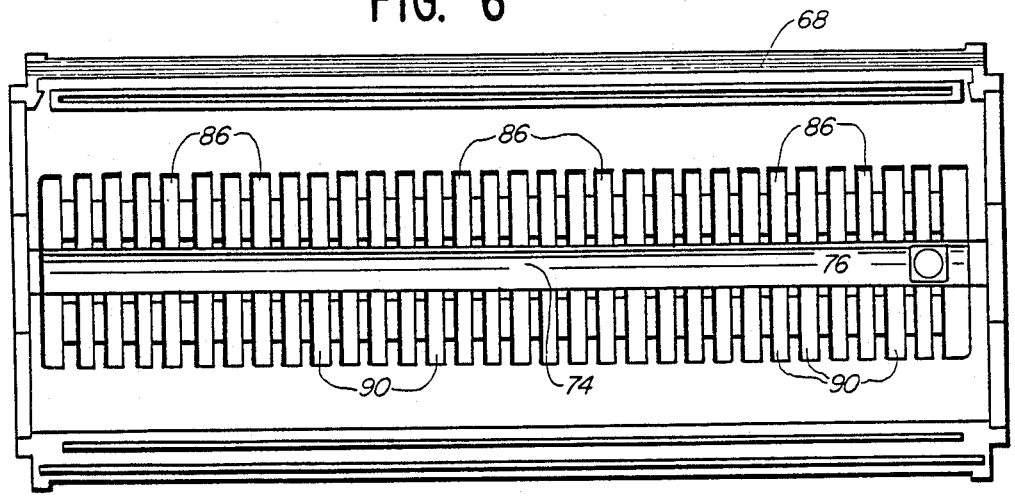
FIG. 6 is a bottom plan view of the upper half of the mass transfer device housing of FIGS. 3 and 4, without the screen.
Figure 7:
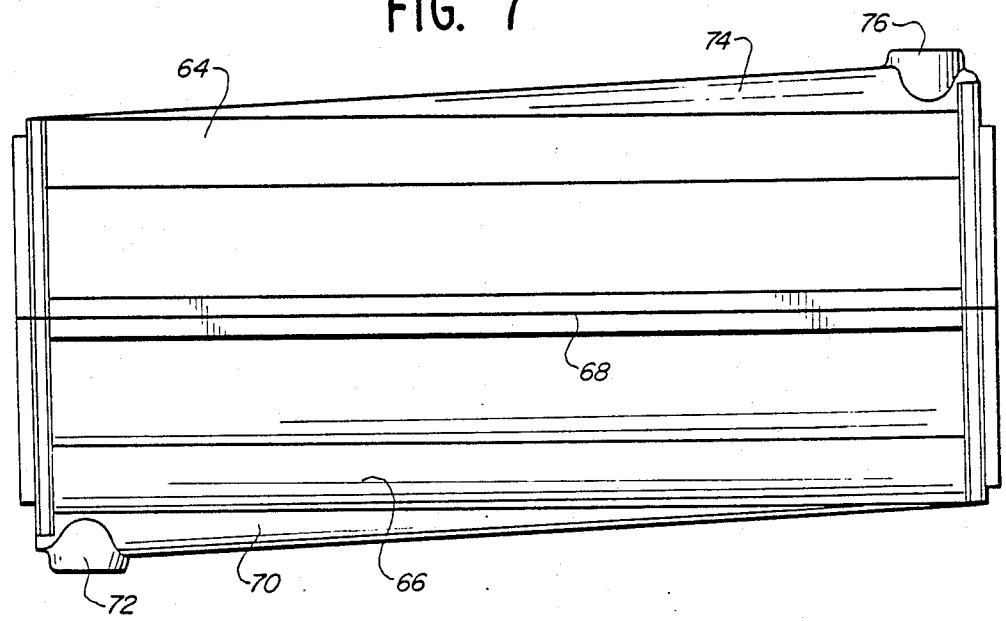
FIG. 7 is a side elevational view of the mass transfer device housing of FIG. 3.

Housing 60 defines a generally circular opening 80 for receiving hollow fiber bundle 10. However, adjacent blood outlet manifold 74 there is provided an expansion volume 82 which is defined by a cutout section 84. Cutout section 84 is defined by angle b (FIG. 3) which angle is preferably 75°, and includes a stepped portion 85 defined by angle a, which angle is preferably 52°. Stepped portion 85 is used to receive a screen 88. Referring to FIGS. 4 and 6, screen 88 underlies a first plurality of longitudinally spaced ribs 86 on one side of outlet manifold 76 and a second plurality of longitudinally spaced ribs 90 on the opposite side of outlet manifold 76.

Figure 5:
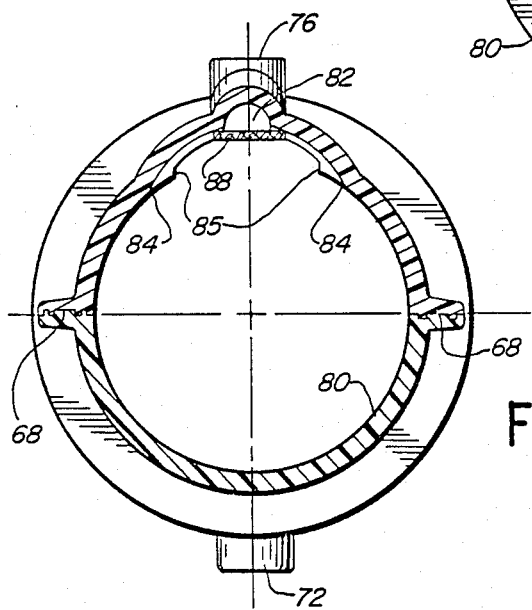
FIG. 5 is similar to FIG. 4, but shows a modification of the outlet screen location.

In the FIG. 5 embodiment, screen 88' is interposed between the first plurality of ribs 86 and the second plurality of ribs 90.

It has been found that if the outlet fibers are restrained by the inside wall of the housing having a constant diameter throughout, including at the outlet manifold, the void fraction at the outlet will decrease and there will be a high pressure drop. In accordance with the present invention, the outlet volume is increased by providing the expansion volume. The surface defining the expansion volume is shaped to build up the volume gradually. To this end, this space may be defined by an arcuate wall that has a radius that is smaller than the radius of generally circular opening 80.

Screen 80 acts as a restraining means to prevent the fibers from being forced unduly into the open volume. Thus the screen 80 prevents the fibers from migrating too far into the outlet volume and provides a controlled expansion.

Although illustrative embodiments of the invention have been shown and described, it is to be understood that various modifications and substitutions may be made by those skilled in the art without departing from the novel spirit and scope of the present invention.

What is claimed is:

1. A process for making a hollow fiber bundle, comprising the steps of:

providing a core having a longitudinal axis and opposite ends, winding a length of the hollow fiber around the core from an arm in a plane that is at an acute angle with respect to the longitudinal axis of the core and is between the opposite ends of the core;

providing relative rotation between said longitudinal axis and the position of the winding arm; and during winding of the hollow fiber around the core, continuously applying adhesive binding means between layers of hollow fibers in a plurality of longitudinally spaced locations along the core, said adhesive binding means being applied intermediate the opposite ends and spaced from the opposite ends so as to retain the hollow fibers in substantially the same position as wound, during use of said hollow fiber bundle, and whereby said adhesive means are disposed in an outwardly spiral manner from at least a position near said core to a position immediately beneath the outermost layer of said hollow fiber.

2. A process in accordance with claim 1 wherein said adhesive binding means is an adhesive binding strip.

3. A process in accordance with claim 1, wherein said adhesive binding means is selected from the group consisting of double-sided pressure sensitive tape, pressure sensitive string and liquid adhesive.

4. A process in accordance with claim 1, wherein said adhesive binding means is applied from a shaft in a fixed location, said shaft being freely rotatable and driven by the rotating core.

5. A process in accordance with claim 1, wherein said adhesive binding means is applied in a plurality of equally spaced locations along the core.

6. A process in accordance with claim 1, wherein the step of providing relative rotation comprises rotating the core around its longitudinal axis; and the applying step comprises applying the adhesive means from a fixed location to the rotating core.

7. A process in accordance with claim 1 wherein said adhesive binding means is disposed in an outward spiral and alternated with layers of hollow fiber around said core.

8. A process in accordance with claim 7 wherein the outermost layer of the bundle is comprised of hollow fiber.

9. A hollow fiber bundle comprising:
a generally cylindrical core having opposite ends; a plurality of layers of hollow fibers wound around said core; and
a series of adhesive binding strips positioned between said plurality of layers of hollow fibers, located intermediate said opposite ends and spaced from said opposite ends of said core, wherein said adhesive binding strip is arranged in an outward spiral from at least a position near said core to a position immediately beneath the outermost layer of said hollow fibers, and alternated with layers of hollow fiber around said core.

10. A hollow fiber bundle in accordance with claim 9 wherein said adhesive binding strip is an adhesive binding strip.

11. A hollow fiber bundle in accordance with claim 9 wherein said adhesive binding strip is selected from the group consisting of double-sided pressure sensitive tape, pressure sensitive string and liquid adhesive.

12. A hollow fiber bundle in accordance with claim 9 wherein the outermost layer of said bundle is comprised solely of hollow fiber.

* * * * *